United States Patent [19]
Hager

[11] 3,924,588
[45] Dec. 9, 1975

[54] POSITIVE CRANKCASE VENTILATION SYSTEM

[76] Inventor: Lowell T. Hager, 401 Dayton Ave., West Chicago, Ill. 60185

[22] Filed: Jan. 18, 1974

[21] Appl. No.: 434,669

[52] U.S. Cl. ............................ 123/119 B; 137/480
[51] Int. Cl.² ........................................ F02B 33/00
[58] Field of Search ................ 123/119 B; 137/480

[56] References Cited
UNITED STATES PATENTS

| | | | |
|---|---|---|---|
| 1,785,726 | 12/1930 | Balash | 137/480 |
| 1,812,860 | 7/1931 | Burns | 123/119 B |
| 3,000,394 | 9/1961 | Gold | 137/480 |
| 3,111,138 | 11/1963 | Humphreys | 123/119 B |
| 3,237,617 | 3/1966 | Daigh | 123/119 B |
| 3,272,192 | 9/1966 | Jensen | 123/119 B |
| 3,359,960 | 12/1967 | Pittsley | 137/480 |
| 3,491,732 | 1/1970 | Dahm | 123/119 B |
| 3,494,339 | 2/1970 | Fernandez | 123/119 B |
| 3,709,204 | 1/1973 | Noponen | 123/119 B |

*Primary Examiner*—Wendell E. Burns
*Assistant Examiner*—Daniel J. O'Connor
*Attorney, Agent, or Firm*—Darbo, Robertson & Vandenburgh

[57] ABSTRACT

The engine crankcase is connected to the intake manifold of carburetor engines through a poppet valve with spring adjusted so that the valve is closed while starting, partly open while idling, closed during acceleration and wide open during deceleration whereby to maintain relatively uniform optimum vacuum in the manifold. The crankcase is also connected with the intake air cleaner. Both sides of V-type engines are connected to the valve inlet.

5 Claims, 11 Drawing Figures

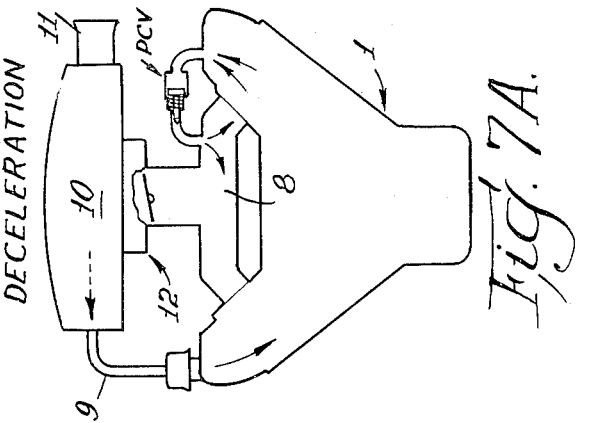
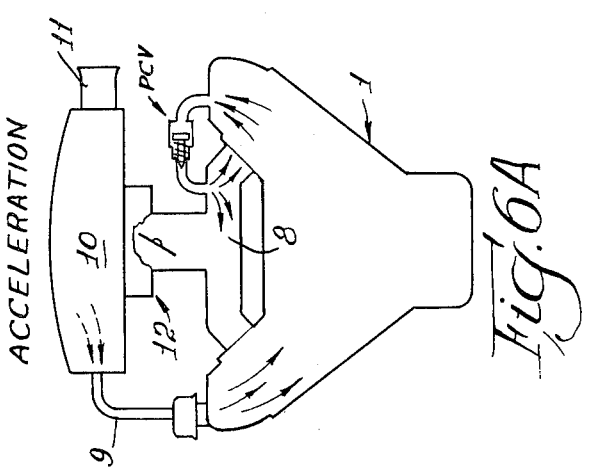
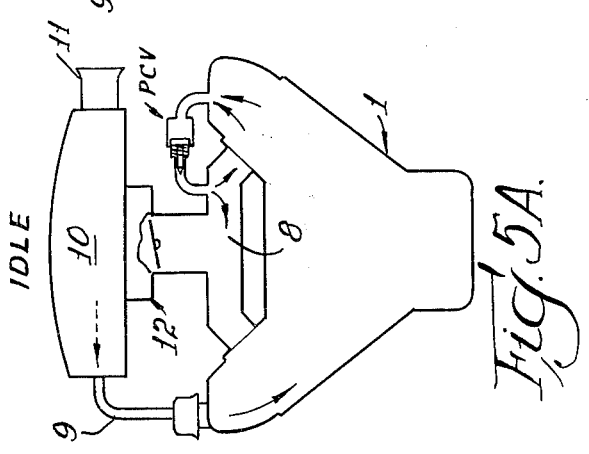
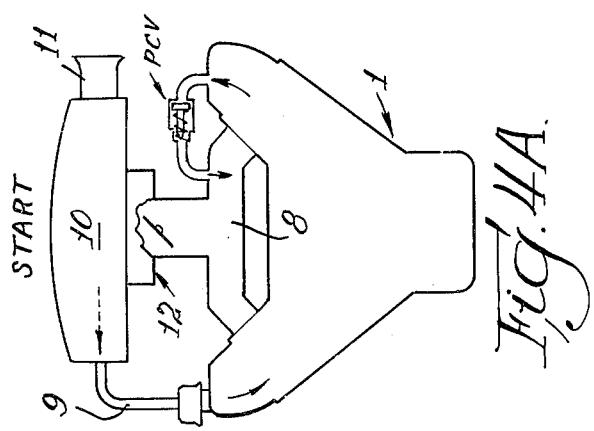

POSITIVE CRANKCASE VENTILATION SYSTEM

BACKGROUND AND SUMMARY OF THE INVENTION

The increasing use of the internal combustion engine as motive power for passenger cars, busses, trucks, tractors, industrial equipment and the like has resulted in problems of air pollution and fuel shortages. Various expedients are being employed and others are being developed for the reduction of pollutants emitted into the atmosphere. Prior to the application of remedial equipment, approximately 20% of the total quantity of unburned hydrocarbons escaped to the atmosphere from the crankcase of the engine which received blowby gases from the several cylinders. To eliminate this source of pollution, crankcases are being closed to the atmosphere and the crankcase vapors are conducted to the intake manifold for ingestion and combustion in the cylinders.

The system for handling the crankcase vapors, generally referred to as "positive crankcase ventilation," or simply PCV, includes a valve the function of which is to meter the flow of vapors and gases from the crankcase to the intake manifold during various modes of operation of the engine; i.e., idle, acceleration, cruising, deceleration, of a vehicle. The valve plunger floats between a seat at its intake end and a metering arrangement at its outlet end, subject to the forces of a spring urging the plunger toward its seat and the degree of vacuum in the intake manifold. The ordinary PCV valve is completely closed only when the engine is not running. During periods of deceleration and idle, manifold vacuum is relatively high and the plunger is drawn by the vacuum against the force of the spring toward the outlet end of the valve, restricting but not completely stopping the flow of air and crankcase vapors to the intake manifold. During acceleration and constant speed operation, the plunger assumes a mid-position permitting maximum flow of the vapors into the intake manifold.

All positive crankcase ventilation systems permit ventilating air to enter the crankcase and pass, along with crankcase vapors, to the intake manifold during all times that the engine is in operation.

It has been found that while the positive crankcase ventilation system which employs the metering valve as described performs its intended function of continuously withdrawing vapors from the crankcase and conducting them to the engine intake, its use tends to make starting of the engine more difficult, especially in cold weather, cause rough running of the engine and requires relatively frequent attention for proper operation.

The object of the present invention is to provide an improved crankcase ventilation system which in large measure avoids the adverse consequences of use of the standard positive crankcase ventilation system above described. More specifically, the system, while providing for the continuous ventilation of the crankcase, avoids the supplemental supply of air to the intake while starting the engine and permits the flow of relatively large quantities of air to relieve the otherwise excessively high vacuum developed in the intake manifold during deceleration. Thus, a relatively richer mixture of fuel and air is supplied to the cylinders on starting to promote ignition of the cold mixture in the cylinders and air is supplied to prevent the passing through of unburned hydrocarbons to the exhaust during deceleration. A further object of the invention is to improve the ventilation of the crankcases of V-type engines by withdrawing fumes from both sides.

The achievements and advantages of the positive crankcase ventilation system of this invention will become more fully apparent as the description thereof proceeds in conjunction with the accompanying drawings.

DESCRIPTION OF THE DRAWINGS

FIGS. 4–7 are schematic representations of the V-type engine showing the flow of gases and vapors during the different modes of operation of the engine.

FIGS. 4A–7A are schematic views similar to those of FIGS. 4–7 and showing the flow of gases in the known positive crankcase ventilation system for comparison purposes.

DESCRIPTION OF SPECIFIC EMBODIMENT

Figure 1:
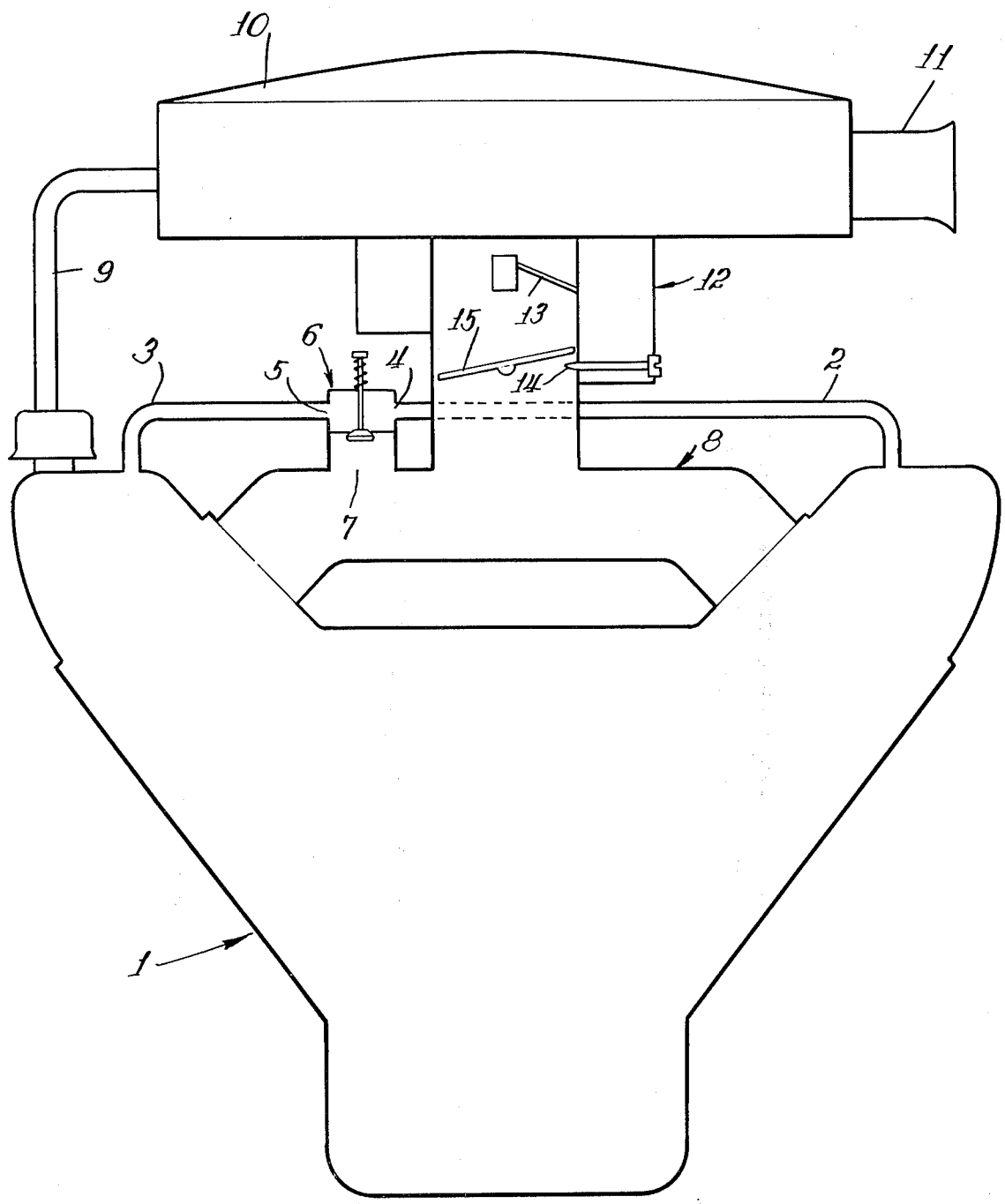
FIG. 1 is a schematic view of a V-type engine illustrating the positive crankcase ventilation system of the invention.

The improved system of the invention contemplates gas flow connection between the interior of the engine crankcase and the intake manifold through a control valve and connection of the engine intake air cleaner with the crankcase. As shown in FIG. 1, the interior of crankcase 1 is connected through suitable hoses 2 and 3 to intake ports 4 and 5 of valve 6. The valve is mounted at its outlet 7 upon intake manifold 8 to permit flow through the valve into the intake manifold. Another hose 9 connects the crankcase with intake air cleaner 10. Engine intake air flows into the cleaner through an inlet 11 and thence through the carburetor system designated generally by the numeral 12 and including fuel jet 13, idle jet 14 and accelerator butterfly valve 15.

Figure 2:
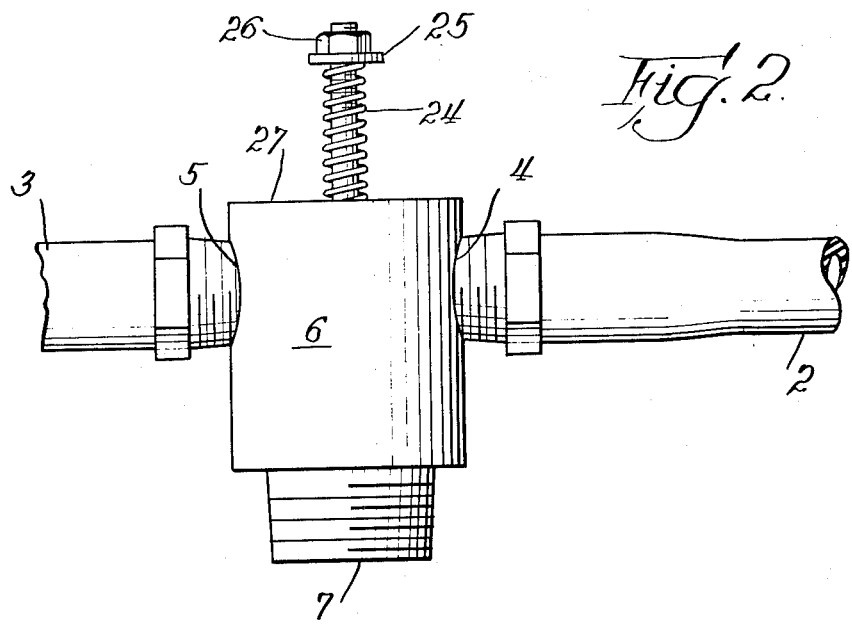
FIG. 2 is an elevational view of the valve employed in the system.
Figure 3:
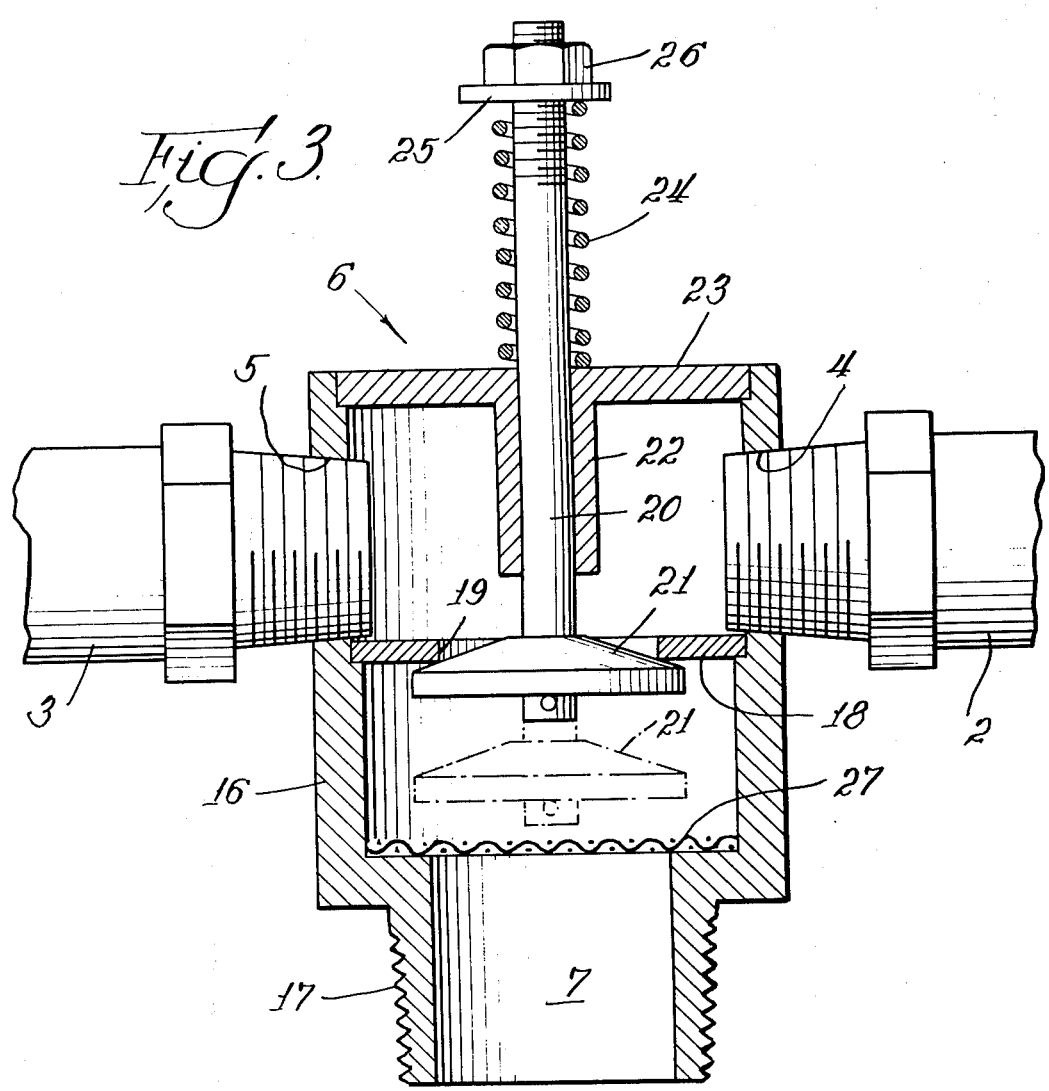
FIG. 3 is a cross-sectional view of the valve.

The characteristics of valve 6 will be understood from its construction which is shown in FIGS. 2 and 3. The cylindrical valve housing 16 has threaded intake ports 4 and 5 in its side walls and a threaded snout 17 at outlet 7 in the bottom of the valve housing for mounting upon and connecting with the intake manifold of an engine. A valve seat 18 having a circular opening 19 is permanently mounted within the housing. A valve stem 20 having a plunger 21 fastened to its inner end extends through a guide sleeve 22 to the exterior of the valve. The top of the valve housing is closed as indicated at 23. A coil spring 24 is held in compression between washer 25 and the top of the valve housing. The degree of compression of spring 24 is determined by the position of adjustment nut 26 which screws upon the threaded end portion of valve stem 20. A metal wire safety screen 27 spans valve outlet 7.

While the purpose of the standard positive crankcase ventilation valve, as above described, is to meter the flow of gases from the crankcase to the intake manifold, restricting the flow under conditions of greatest intake manifold vacuum, the objective of the system of the present invention is to maintain a reasonably uniform optimum level of vacuum in the intake manifold during operation of the engine while, at the same time, drawing vapors from the crankcase and conducting them to the intake manifold. As will be seen from the schematic views of the V-engine installation of FIGS. 4–7, already described with reference to FIG. 1, the valve is located and installed to permit flow of the gases into the intake manifold responsive to the level of vacuum therein. The valve is drawn open against the force exerted by spring 24 when the vacuum is sufficiently great. As the valve opens, gases are drawn through the valve from the crankcase into the intake manifold. The greater the vacuum, the farther the valve is opened and the greater the flow of gases into the manifold tending to satisfy the vacuum. The gases thus drawn into the intake manifold comprise the cylinder blowby and such vapors as may evaporate from the lubricating oil in the crankcase plus air drawn into the crankcase from the intake cleaner. For a given engine, the valve is large enough to permit flow adequate to respond to vacuum peaks in the intake manifold as will be understood more fully from the following explanation of the operation of this system.

The pattern of flow of gases through the system during the several modes of operation of the V-8 type passenger car engine illustrated by way of example is shown in the schematic illustrations of FIGS. 4–7. Referring, first, to FIG. 5, the flow conditions obtaining during the idling of the engine are indicated by the arrows which show direction and indicate by their numbers the quantity of flow. The valve, after installation, is adjusted by means of nut 26 so that it is slightly but appreciably open while the engine is idling at normal idling speed. Crankcase fumes are thus withdrawn at a relatively low level of flow, air flowing from the intake cleaner as may be required to satisfy subatmospheric pressure obtaining within the crankcase by reason of the suction of gases into the intake manifold. Flow is approximately equal through hoses 2 and 3 so that thorough ventilation is achieved.

Upon acceleration, the flow pattern is altered to that depicted in FIG. 6. Since the level of vacuum in the intake manifold is less than that at idle, valve 6 is closed so that there is no flow through it into the intake manifold to further reduce the already low vacuum in the manifold. However, the great demand for intake air effects the suction of gases from the crankcase through hose 9 and into the intake cleaner to mingle with intake air as it is supplied through the normal passageway at the carburetor and into the intake manifold. Since the suction is applied to the crankcase at the one side of the engine, a cross-flow from the opposite side through hoses 2 and 3 will ensure complete ventilation of the crankcase interior during acceleration of the engine.

On deceleration, the engine pumps a very high vacuum in the intake manifold which draws valve 6 wide open and permits maximum flow of air and vapors from the crankcase into the intake manifold to mitigate the vacuum condition. A large part of the gases so passing into the intake manifold are supplied to the crankcase through hose 9 from the intake cleaner, thoroughly scavenging the crankcase.

As is well known, a relatively rich fuel-air mixture is required to effect ignition when starting a cold engine. A vacuum in the intake manifold is essential to the feeding of fuel to the cylinders as a consequence of the air flow and also, if the engine is choked, the direct suction of fuel into the airstream. At this stage, the maintenance of the highest vacuum commensurate with the limitations of electric starter operation of the engine is desirable. The level of the vacuum is below that at which valve 6 opens so that there is no flow through the valve into the intake manifold.

Although the size of the valve used in the system of this invention is not critical, it should be large enough to permit sufficient flow on deceleration to maintain the level of vacuum in the manifold only moderately greater than that which obtains during the idling mode. For the majority of passenger car engines which do not exceed approximately 400 cubic inch displacement, a valve having a seat opening diameter of three-quarters of an inch with an appropriate rubber plunger is suitable. The valve may be equipped with a compression spring approximately 1 inch long which will start to compress at approximately 13 pounds and will travel approximately one-quarter of 1 inch under a compressive pressure of 18 pounds. For engines having displacements greater than 400 cubic inches, correspondingly larger valves should be used.

ACHIEVEMENT

It will be understood that the system herein described and shown achieves two principal objectives; namely, positive and thorough crankcase ventilation with maintenance of reasonably uniform temperatures in the two sides of the engine in the case of V-type engines, and improved fuel efficiency. For a more complete understanding of the system and its operation, it will be compared with the more or less standard PCV system by reference to flow conditions which tend to obtain during the several modes of operation. FIGS. 4–7, showing flow patterns which exist in typical V-type engines equipped with the system of the instant invention will be compared and contrasted with the flow patterns under similar conditions equipped with the standard PCV system, depicted in FIGS. 4A–7A.

When an engine is standing still, that is, prior to starting, the valves of both systems are closed. When driven by the starting motor, on starting, a vacuum sufficient to draw air through the carburetor to supply the air-fuel mixture to the intake manifold and the several cylinders is created. As is indicated in FIG. 4A, this vacuum is sufficient to draw the plunger of the PCV valve away from its seat to permit some flow of cold air from the crankcase into the intake manifold where it tends to dilute the air-fuel mixture which tends to render ignition less probable. This undesirable opening of the PCV valve is a necessary consequence of the relatively small force exerted by the compression spring, a requirement for the achievement of maximum flow through the valve on acceleration and high speed cruising, discussed below.

The valve of the improved system of the invention (FIG. 4) remains closed during the starting operation. At this stage, there is no appreciable flow of blowby gases into the crankcase requiring withdrawal and the absence of flow of cold air directly into the intake manifold which tends to make starting more difficult is avoided.

When the engine is idling, the vacuum in the intake manifold may be in the range of approximately 19–21 inches of mercury. Under this condition, as is indicated in FIGS. 5 and 5A, the valves of both systems permit limited flow from the crankcase into the intake manifold. In the usual PCV installation on a V-type engine, however, the total withdrawal of gases from the crankcase is from one side, cold air from the intake cleaner flowing into the crankcase at the other side. This causes an undesirable difference in temperature conditions at the two sides of the engine. The improved system provides for the withdrawal of crankcase gases from both sides.

With the very substantial reduction in the magnitude of the vacuum in the intake manifold during acceleration, the plunger of the PCV valve moves to mid-position, permitting maximum flow with comparable inflow of cold air at the opposite side of the V-type engine. By contrast, the valve of the improved system is closed, blowby vapors and other crankcase gases being withdrawn into the air intake of the engine. Whereas the gases withdrawn from the crankcase in the PCV system are conducted directly into the intake manifold (downstream from the carburetor), these hot gases, in the improved system, are supplied to the carburetor to enhance the vaporization of the fuel. Also, in this system as installed on a V-type engine, the relatively low pressure condition which obtains at the intake of hose 9 tends to draw gases from the opposite side of the engine through hoses 2 and 3 thus providing a more uniform ventilation.

During deceleration, engines which are not equipped with either system create vacuum conditions in the intake manifold on the order of 25–30 inches of mercury. This vacuum condition is only partially relieved in the PCV system since flow through the valve is limited by the metering structure. The undesirable consequences of the excessive vacuum, including some degree of flooding of the intake manifold with fuel and the starving of the cylinders for air with consequent emission of unburned hydrocarbons in the exhaust, continue to obtain. In the improved system, however, the maximum flow of crankcase vapors and gases through the valve avoids the suction of excessive fuel into the intake manifold and the starving of the cylinders of combustion air so that pollution of the atmosphere by unburned hydrocarbons and carbon monoxide is minimized.

The limited passageways for the gases and vapors to flow through the PCV valve, inherent in the metering function, tend to become clogged in time, and replacement or cleaning is necessary to insure the intended flow. The valve of the improved system of the invention is self cleaning since the strong flow of air and gases through the wide open valve during deceleration has a strong flushing action, blowing out any particles that may have been stuck temporarily in the valve.

In summary, the improved crankcase ventilation system contributes to easier starting and more efficient operation and results in less pollution of the atmosphere with unburned hydrocarbons and carbon monoxide. With respect to the latter, the following results were obtained in a test using a 1969 Mercury automobile having a 390 cubic inch displacement engine:

| Pollutant | Factory PCV equipped grams per mile | With improved system grams per mile |
|---|---|---|
| hydrocarbons | 3.67 | 3.45 |
| carbon monoxide | 14.38 | 11.83 |

I claim:

1. A positive crankcase ventilating system for an engine having a carburetor and an intake manifold and a crankcase including gas flow connections between crankcase and intake manifold and between crankcase and carburetor air intake, in combination, a flow control valve interposed in the crankcase-intake manifold connection, said flow control valve being a spring poppet valve oriented to permit flow from the crankcase into the intake manifold, the extent of opening of said valve from the extreme positions of closed to full open being progressively responsive to the degree of vacuum in the intake manifold, the force applied by the spring of said poppet valve tending to close the valve against the pull of the vacuum in the intake manifold being such that the valve is only partly open when the engine is idling, is closed during substantial acceleration, and is full open during substantial deceleration.

2. Structure in accordance with claim 1 and including means accessible externally of the valve for adjusting the force of the spring.

3. Structure in accordance with claim 2 wherein the adjusting means comprises a portion of the poppet valve stem which extends above the valve body, the end portion of said valve stem being threaded, a compression spring upon said extended portion of said valve stem, and a nut screwed upon said end portion of said valve stem to maintain said spring under adjustable compressive stress.

4. Structure in accordance with claim 1 wherein the valve is mounted directly upon the intake manifold.

5. Structure in accordance with claim 1 wherein the system is for a V-type engine and the connection between the crankcase and the intake manifold comprises connection of the intake of the valve with both sides of the engine.

* * * * *